March 15, 1955 F. W. WILLIAMS 2,704,123
SLOPING AND MARKING APPARATUS
Filed Nov. 29, 1951 2 Sheets-Sheet 1

INVENTOR:
FRANK W. WILLIAMS.
BY
W. R. Liberman
ATTORNEY:

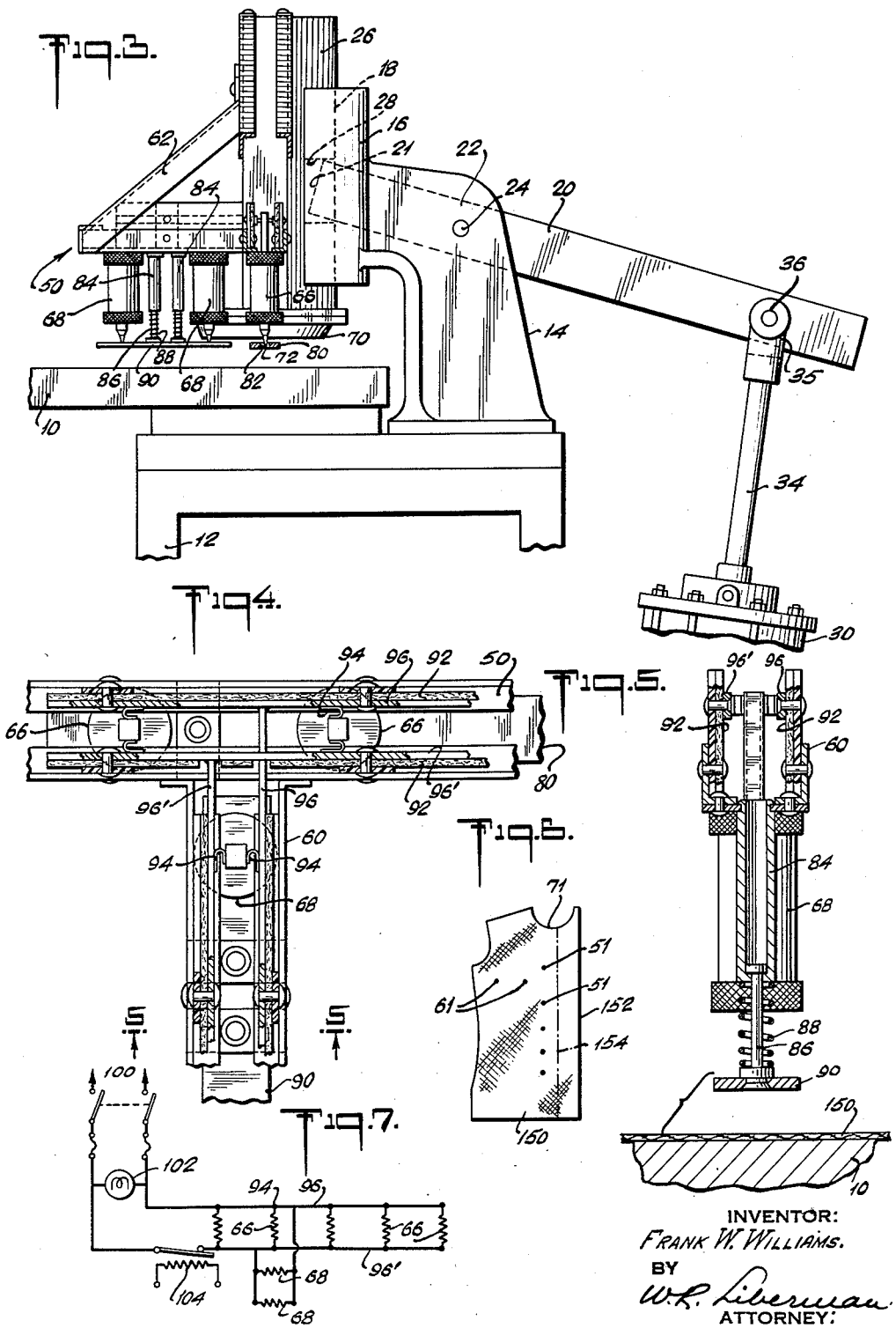

United States Patent Office 2,704,123
Patented Mar. 15, 1955

2,704,123

SLOPING AND MARKING APPARATUS

Frank W. Williams, Middletown, N. Y., assignor to The Manhattan Shirt Company, New York, N. Y., a corporation of New York Application November 29, 1951, Serial No. 258,852

1 Claim. (Cl. 164—15)

The present invention relates generally to the art of forming articles of wearing apparel. Specifically, it relates to the art of manufacturing such articles of wearing apparel as shirts, blouses or coats. Even more specifically, however, it relates to the apparatus for forming the frontal portions of such articles of wearing apparel as shirts, blouses and coats or jackets, and in particular with forming the neck or collar opening and similarly therewith locating the positions of the buttons and buttonholes in proper relation thereto, and also the position of the breast pocket, if same is to form a part of the completed article.

The main object of the present invention is the provision of a new and improved apparatus for forming the neck or collar opening or neck slope as same is commonly known, and for accurately locating and defining, simultaneously therewith, the positions of the buttons, buttonholes and breast pocket in precise relation to the neck slope.

Another object of the present invention is the provision of an apparatus for so operating on the material involved as to permanently form the neck slope and permanently mark the material, without however damaging same, as to accurately locate the positions of buttonholes, buttons and breast pocket in proper and precise relation to the neck slope.

The apparatus of the present invention is characterized by the provision of means to die cut the material being worked to form the neck slope, i. e., that portion of the material into which the collar or collar neckband is set, and similarly therewith to needle punch and "burn" location marks for the button, buttonholes and/or the pocket, whereby the proper and precise positioning of the buttons and buttonholes and/or pocket on the shirt front is secured, and to perform these operations automatically on a plurality of plies of material at one time and in one operation.

In the manufacture of such articles as outer shirts, for example, a number of plies of material are stretched along a suitable support, and the different parts of the garment outlined on the upper ply, as for example the rear panel, the two front panels, the sleeves, etc. The panels are then cut out from the mass by suitable cutters. The material of the individual plies being relatively thin and soft, it is difficult to cut more than one edge of each panel with precision unless the plies are compressed together and tensioned during the cutting operations. Such compression and tensioning is impractical, and the problem arises as to proper location of the buttons, buttonholes and/or pockets with relation to the neck slope and the proper relation of the neck slope with respect to the one edge definitely formed.

While the industry has die cut the neck openings, and while the industry has marked the positions for buttons, buttonholes, etc., the achievement of precise positioning of the buttons and buttonholes, etc. with respect to the neck slope always has presented a problem, necessitating the exercise of considerable skill and extreme care, all of which adds greatly to the time of manufacture and hence the cost of the finished article. With the apparatus of the present invention, this can be done quickly, easily and automatically by a relatively unskilled operator; thereby reducing the cost of the garment, eliminating faulty garments and insuring perfection at least in the positioning of the button, buttonholes and pockets with respect to the neck openings.

Other and more specific objects of the present invention than those enumerated above will in part be apparent and in part specifically pointed out in the following description of an illustrative embodiment.

In the drawings annexed hereto and forming a part hereof,

Figure 3 is a side elevational view of the upper portion of the apparatus;

Figure 4 is a horizontal section through a portion of the battery;

Figure 5 is a section on the line 5—5 of Figure 4;

Figure 6 is a plan, on reduced scale, of a panel after it has been treated by the apparatus of the present invention; and Figure 7 is a wiring diagram of the electrical circuit.

Figure 1:
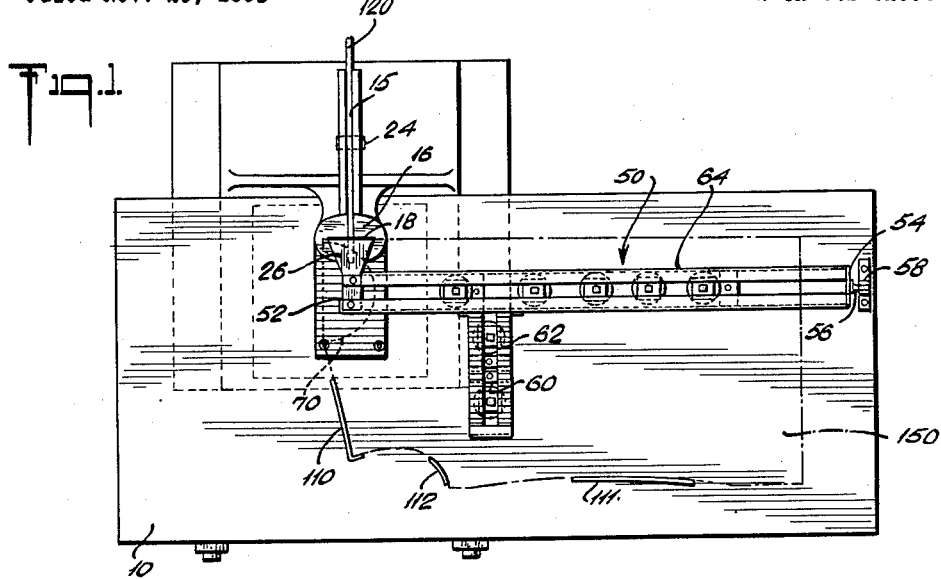
Figure 1 is a top plan view of one form of apparatus constructed according to and embodying the present invention.

The apparatus of the present invention includes a flat-topped table portion 10 permanently secured atop a suitable fixed support structure 12. A vertically extended bracket 14 is secured atop support 12, said bracket 14 having a forwardly directed head 16, having a vertical slideway 18 therewithin. The upper portion of the body of bracket 14 is bifurcated to provide a channel 15 for an elongated link 20 to extend therethrough and pivot therein, said link 20 being pivotally secured off-center thereof as indicated at 22 by a horizontally extending pin 24 passing through registering apertures in the bracket walls and the link 20. The front end 21 of link 20 extends through the trackway 18 in the bracket head 16 to such extent as to fit into and engage the rear of a ram 26 which is slidably keyed into the slideway 18 of head 16, as shown in Figure 1. A suitably sized and shaped recess 28 is formed in the rear of ram 26 to receive therewithin the link end 21, in order that movement of link end 21 will cause a corresponding movement of ram 26 within slideway 18.

A double-acting air cylinder 30 is provided and pivotally fixed to support structure 12, as at 32. Cylinder 30 includes a piston 34 extending axially from the upper end thereof, terminating in a yoke 35 by which piston 34 is pivoted to link 20 adjacent its rear end as at 36. It will be noted that the distance between the front end 21 of link 20 and pivot point 22 is much shorter than the distance between the pivot 22 and the point of connection 36 with piston 34. Thus, any linear movement of piston 34 will cause a similar linear movement of the rear of the link, and a linear movement of link end 21 in the opposite direction and to a lesser extent, as will be obvious.

A horizontally extended channel member 50 is provided, and an end 52 thereof is bolted or otherwise permanently secured to ram 26 so as to move therewith vertically and reciprocably within trackway 18. The other end 54 of member 50 is provided with an offset pin 56 extending lengthwise thereof and outwardly therefrom, which pin 56 is trapped within a vertically extending channel 57 in a guide post 58 fixed atop table 10. It will be noted that guide post 58 functions to maintain the free end of member 50 in vertical alignment with the engaged end and ram 26. A cross-member 60, also channel shaped, is secured to member 50 near the front thereof, at right angles thereto and in the plane thereof. Suitable braces or bracketings, as 62, 64, are provided to support members 50, 60 rigidly on ram 26 for movement simultaneously therewith, as is desirable and necessary for the proper functioning of my apparatus.

The undersides of members 50, 60 have secured thereto a plurality of encased heating coils 66, 68, the securement preferably being of such character as to permit relative movement lengthwise of members 50, 60 as desired. As shown, five coils 66, 66 are provided and mounted on the underside of member 50, depending therefrom, and these may be spaced equidistantly or in any other relative positioning desired. Normally, these are spaced apart uniformly since for most purposes, the buttons and buttonholes are spaced apart equidistantly. Two coils 68, 68 are shown on the underside of cross-member and depending therefrom, these being spaced from the line of coils 66, 66 and from each other to locate the upper points of attachment of a pocket. A neck slope cutting blade 70 is mounted on the underside of ram 26, in rearwardly offset relation to the line of coils 66, 66. Each heating element includes a sharp needle 72 depending from the underside thereof, in the axis thereof to a point below the cutter blade 70.

Figure 2:
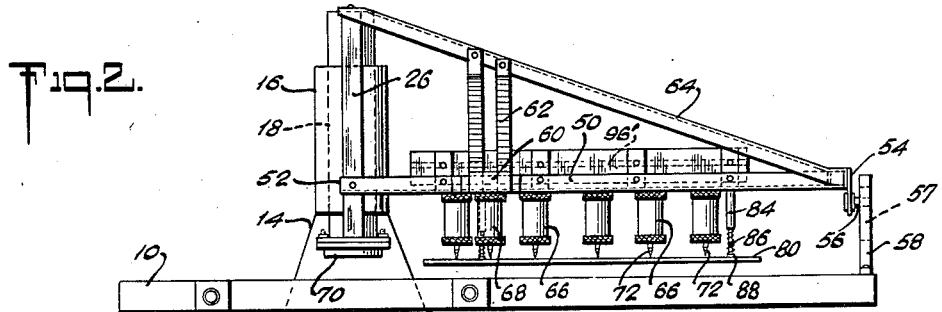
Figure 2 is a front elevational view thereof.
Figure 2:
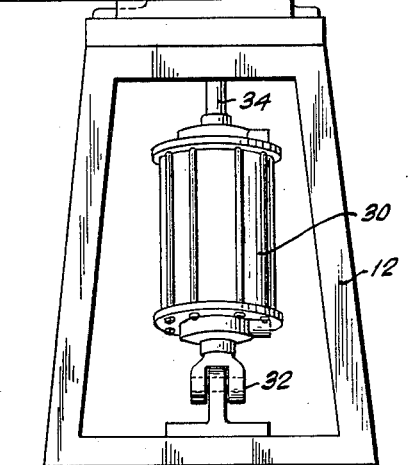

A horizontally extended, flat hold-down bar 80 is suspended beneath member 50, in vertical alignment therewith, said bar 80 being longitudinally slotted at 82, and of such length as to extend beyond both ends of the line of coils 66, 66. Bar 80 is resiliently supported below and in spaced relation to member 50 by hollow tubes 84, 84 extending from and fixed to member 50, into which tubes are received registering pins 86, 86 fixed to and extending upwardly from bar 80. A normally expanding coil spring 88 trapped above bar 80 and below tube 84 urges bar 80 downwardly from member 50, and the parts are so dimensioned that in the upper position of ram 26 as shown in Figures 2 and 3, the ends of needles 72, 72 lie in the plane of bar 80. A hold-down bar 90, similar to bar 80, is provided for cross-member 60, at right angles to bar 80.

Referring now to Figures 4 and 5, the heating members are enclosed in the casings 66, 68, and the electrical conductors thereto suitably insulated, the insulation being indicated at 92. The coils include blades 94, 94 for contact engagement with strips 96, 96'. Blades 94, 94 are spring pressed against the sides of the channel members 50, 60, and are friction held thereby in any desired location while permitting shifting thereof lengthwise along the channels, contact being maintained in any positioning of the coils by the pressure of spring blades 94, 94 against strips 96, 96'.

When the apparatus is electrically connected to a source of power, as at 100, glow lamp 102 is energized. The heating elements associated with needles 72, 72 are preferably of such character as to generate heat of approximately 700° F., and when this is exceeded, a thermostatic switch 104 in the circuit cuts out, to limit the extent to which the needles 72, 72 are heated by the coils, below the point of charring or burning of the materials being worked.

A plurality of material guides, suitably shaped, as 110, 112 and 111 are mounted atop table 10, and provision may be made, as desired, to vary the spacing between the guides for operating on panels of different size and shaping.

In operation, the material panels as 150, which have been cut out on other apparatus, are disposed atop table 10 and located against shoulder guide 110, arm hole guide 112 and side guide 111 these points having been determined by other forming operations. When cylinder 30 is activated, piston 34 raises the rear end of link 20 upwardly by the engagement at 36. Lever end 21 pivoting downwardly, engaged in recess 28 with ram 26, will depress same, bringing the hold-bars 80, 90 down against the panels 150, and as the downward movement of ram 26 is continued, springs 88, 88 are compressed and pins 86 ride into tubes 84 clamping and holding the panels 150 between bars 80, 90 and the top of table 10. The relatively angled hold-down bars 80, 90 are important in keeping the material smooth for the consequent passage of the heated needles 72, 72 down into and through the panels 150. Simultaneously therewith, cutter blade 70 carried on the underside of ram 26 will sever the material thereunder. The heated needles not only spread apart the strands of the material being treated, but also hold them in such spread apart condition for a sufficient length of time as to permit the punched points to be distinguished easily thereafter when the buttons are to be sewn, the buttonholes made and the pockets sewed. Care must be taken to prevent burning or charring of the material with which the heated needles come into contact, and the switch 104 may be adjusted to break off the circuit when the needles are heated above the safety point.

Figure 6 illustrates a finished panel 105 treated in accordance with the present invention. The neck slope resulting from the cutting by die 70 is indicated at 71. The buttonhole indicators resulting from the simultaneous perforating and heating by needles 72, 72 are indicated at 51, 51. The indicators for the location of the breast pocket, resulting from the simultaneous perforation and heating by the needles depending from coils 68, 68 on the underside of cross-member 60 are indicated at 61, 61. The needles are so located with respect to cutter 70 that when edge 152 is folded under as on line 154, the indicators 51, 51 as well as indicators 61, 61 will be properly and perfectly situated with respect to the side line and neck opening 71.

It will be understood that modifications and changes may be resorted to without departing from the present teachings and that the invention is to be limited in its application only by the scope of the annexed claim.

I claim:

In an apparatus of the character described for simultaneously cutting the neck opening of a shirt front panel and defining the position of the buttons and button holes therein, a horizontally extending, flat-topped table, a vertically reciprocable ram disposed above the table for movement towards and away therefrom, a material shearing member mounted on the underside of the ram in substantially vertical alignment therewith, a horizontally disposed support bar, one end of which is secured to and extends outwardly from and at right angles to the ram, parallel to the table, a plurality of material perforating elements carried by the support bar and extending downwardly therefrom, means to heat the perforating elements, means on the table spaced from the ram to guide the other end of the support bar in its vertically reciprocable path of travel, the perforating elements being relatively shiftable along the length of the support bar, and a forwardly and horizontally extending member in the plane of the support bar rigidly secured thereto between the ends thereof, said forwardly extending member bearing a plurality of spaced material perforating elements depending from the underside thereof for defining the location of a shirt front pocket.

References Cited in the file of this patent

UNITED STATES PATENTS

| 414,288 | Carpenter | Nov. 5, 1889 |
| 433,496 | Stouder | Aug. 5, 1890 |
| 483,555 | Hersey | Oct. 4, 1892 |
| 968,121 | Carlton | Aug. 23, 1910 |
| 1,260,191 | Hagstrom | Mar. 19, 1918 |
| 1,952,618 | Weiler | Mar. 27, 1934 |
| 2,134,961 | Van Der Essen et al. | Nov. 1, 1938 |
| 2,175,725 | Altvater | Oct. 10, 1939 |
| 2,244,550 | Chandler | June 13, 1941 |
| 2,275,612 | Chandler | Mar. 10, 1942 |
| 2,381,476 | Wales | Aug. 7, 1945 |

FOREIGN PATENTS

| 13,005 | Great Britain | of 1886 |